No. 776,463. PATENTED NOV. 29, 1904.
E. GATES.
VEHICLE WHEEL.
APPLICATION FILED JAN. 4, 1904.
NO MODEL.
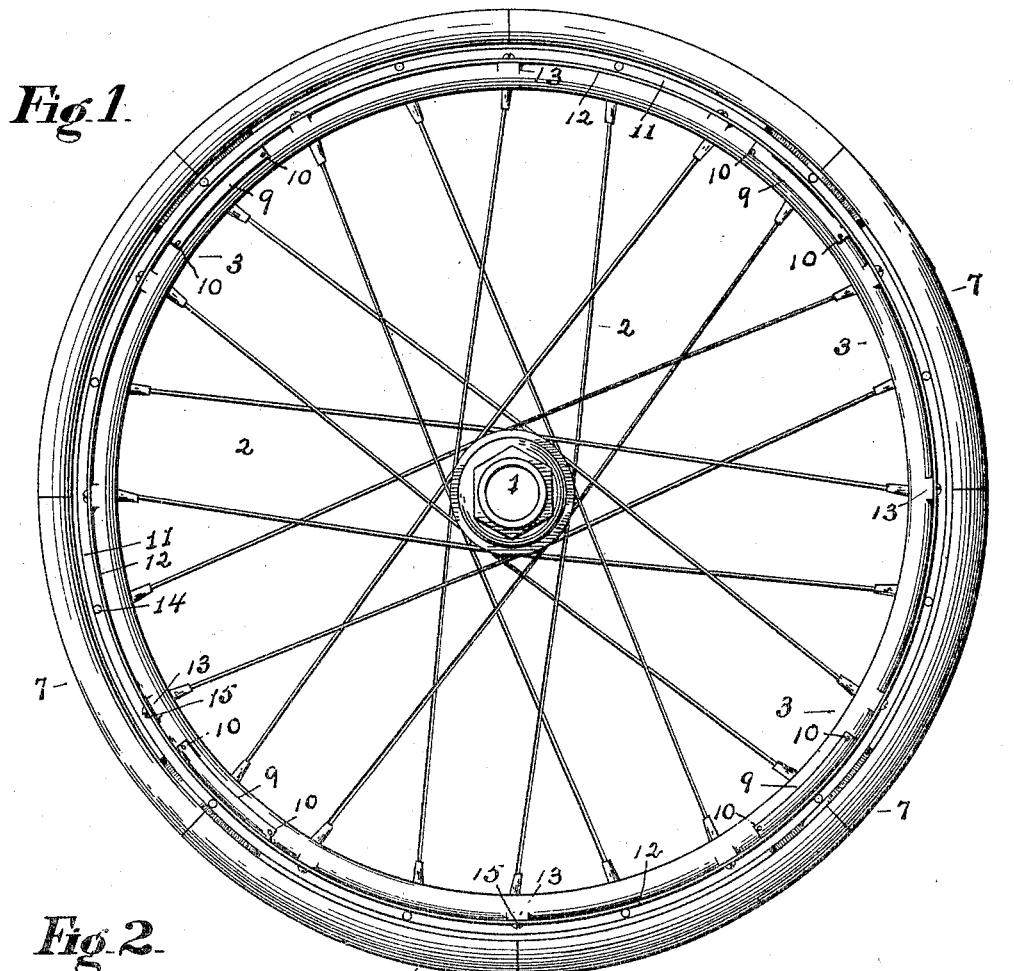
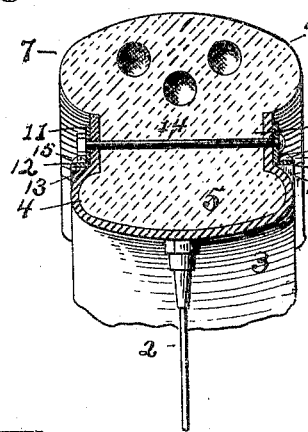
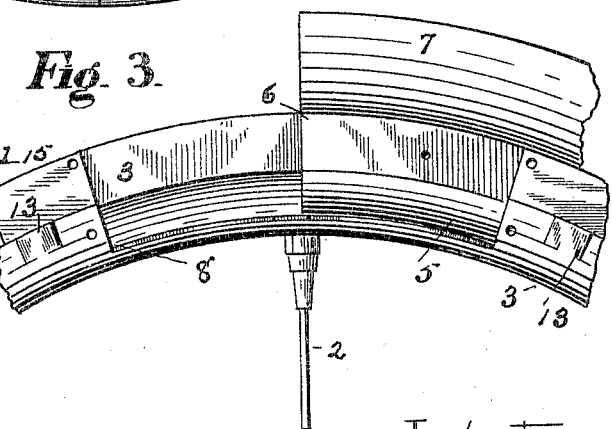
Witnesses
Arthur L. Slee
D. B. Richards
Inventor
Emery Gates
by N. A. Acker
his Atty No. 776,463. Patented November 29, 1904.

UNITED STATES PATENT OFFICE.

EMERY GATES, OF MODESTO, CALIFORNIA.

VEHICLE-WHEEL.

SPECIFICATION forming part of Letters Patent No. 776,463, dated November 29, 1904.

Application filed January 4, 1904. Serial No. 187,634. (No model.)

*To all whom it may concern:*

Be it known that I, EMERY GATES, a citizen of the United States, residing at Modesto, in the county of Stanislaus, State of California, have invented certain new and useful Improvements in Vehicle-Wheels; and I do hereby declare the following to be a full, clear, and exact description of the same.

The present invention relates to an improved construction of a wheel more especially designed for use in connection with automobiles or motor-vehicles, although the same is equally as well adapted for use of vehicles generally desiring the employment of elastic-tired wheels, the object of the invention being to simplify the work of repair of the wheels in case of excessive wear to the tire or damage thereto, thereby reducing the expense attached to the use of such tired wheels, to facilitate the placing of the tire onto the wheel, to lessen or reduce the initial cost of such tired wheels, and to prolong generally the durability, usefulness, and life of the wheel.

The foregoing-mentioned objects are attained by so constructing the wheel that the elastic tire thereof consists of a series of independent sections or segments, each section or segment of the tire being provided with a base portion or extension which slips into and interlocks with the rim of the wheel, the sections or segments of the tire being held together and clamped between circumferential ring plates, which ring plates are located at and secured to each side of the rim of the wheel.

To comprehend the invention, reference should be had to the accompanying sheet of drawings, wherein—

Figure 1 is a side view of the wheel with its parts properly adjusted. Fig. 2 is an enlarged detail cross-sectional end view in elevation, taken through one section of the elastic tire secured within the wheel's rim, said view disclosing the shape of the rim's securing groove or channel, the base of the elastic tire, the clamp or ring plates, and one of the transverse connecting-bolts for securing the clamp or ring plates together; and Fig. 3 is an enlarged detail broken view, in side elevation, of the wheel's rim, a section of the tire being fitted thereto, said view disclosing the inserting-opening in the rim.

In the drawings, the numeral 1 is used to designate the hub of the wheel, and 2 the spokes radially extending therefrom, which spokes connect and hold the rim 3 to the hub. This rim, preferably constructed of metal, is formed with a circumferential dovetailed groove or channel 4 in its outer face, which groove or channel is designed to receive a correspondingly-shaped base 5 of the tire 6. The tread 7 of the tire is of the usual or approved shape for such style of wheels. The entire tire, including the tread and base portions, is made, preferably, of rubber molded to the proper shape. Instead of the tire being constructed as a continuous piece, as is usually the case, the same is made of a series of segments or sections, as clearly illustrated by Fig. 1 of the drawings. In the drawings the tire is disclosed as being composed of eight distinct sections or segments, although the number of segments or sections is immaterial.

To properly fit the segments or sections of the tire into place within the rim to form a complete tire, a series of elongated openings 8 are formed in the inner side of the said rim 3. In the drawings four such inserting-openings or pockets are illustrated, which openings or pockets when the tire segments or sections are properly inserted are closed by the face-plates 9, Fig. 1 of the drawings. These face-plates 9 are secured to the wheel's rim 3 by means of the set-screws 10.

At each side of the tire, between the under face of the tread portion thereof and the upper face of the wheel's rim, is located a clamp or ring plate 11. These plates are continuous ones, being composed of angle-iron. The outwardly-projecting circumferential flange 12 of each clamp ring plate rests upon a series of lugs or shoulders cast or secured to the upper surface of the rim 3 at each side of the circumferential groove or channel 4. The clamp or ring plates are connected and held together by means of a series of transverse bolts 14, which bolts pass through each section or segment of the tire in order to hold the tire firmly to the said plates. The said plates are also united to the rim 3 by means of the outwardly-projecting flanges 12, being secured to the series of lugs or shoulders 13 by the set-screws 15. By means of these clamps or ring plates and their connection to the wheel-rim, the circumferential sectioned tire is held firmly in place and prevented from slipping upon the rim 3 of the wheel.

Inasmuch as each section of the tire is firmly interlocked within the rim of the wheel, there is but slight danger of the tire being displaced by reason of the strain placed thereon during the use of the wheel. In any event only one section of the tire would be liable to be displaced from within its seat, which damage to the wheel is easily repaired, as hereinafter explained. However, inasmuch as the tire sections or segments are each interlocked or mortised within the wheel's rim and thence bolted thereto through the medium of the clamp or ring plates it is only reasonable to presume that to accidentally displace any portion or section of the rim's tire during use of the wheel would first require a destruction of the clamping and uniting means. The liability of the tire being torn from the wheel by reason of the ordinary strain placed thereon during the use of the wheel is thus reduced to a minimum.

To insert the segments or sections of the tire within the rim, it is required that one of the clamp or ring plates—the inner one—be removed and the face or cover plates 9 detached. The segments or sections are then inserted through the pockets or openings 8 at an angle and gradually forced inward until the entire base portion thereof is slipped into the groove or channel 4. After all or any given segment or section has been fitted within the groove or channel 4 the face or cover plates are secured to the rim 3 to cover the pocket-openings 8. The removed clamp ring plate is then inserted or properly positioned and united to its opposing clamp ring plate by the transverse bolts 14, after which the said plate is secured to the rim 3 by means of the set-screws 15, which screw into the shoulders or lugs 13. In case of damage to any one section or segment of the tire it is only necessary to remove such section or segment by disconnecting the described parts and insert a new one in place thereof. The tire is then just as good as a new one. By the described constructed wheel it is not required to discard the entire tire in case of damage thereto; but the damaged portion may be quickly removed and easily repaired by the substitution of a new segment for the damaged one. By keeping on hand ready for use a series of tire segments or sections the user of the vehicle may make his own repair to the damaged tire, inasmuch as it is not required that a skilled workman be called upon for the purpose of removing the parts of the wheel to permit of access being had for the removal of the damaged portion.

It is obvious that the tread portion of the tire may be constructed of solid rubber, or the center portion thereof may be formed hollow, or an inner core of softer rubber may be enveloped by the outer hardened surface. This is a feature well known in the construction of elastic tires and forms no portion of the present invention, which invention resides principally in the construction of a rubber elastic tire composed of a series or plurality of independent arc-sections, with means for securing the said arc-sections to the rim of the wheel.

The abutting edges of the arc-sections of the tread 7 may after the sections have been fitted within the rim of the wheel be united by any suitable cement. The purpose of so uniting the edges of the sections is to prevent liability of dirt working between the meeting edges of the sections.

Having thus described the invention, what is claimed as new, and desired to be protected by Letters Patent, is—

1. In a vehicle-wheel, the combination with a continuous rim, of a dovetailed circumferential channel therein, a rubber tire composed of a plurality of independent arc-sections, a base to each tire-section conforming to the shape of the circumferential channel of the rim, one or more openings in the rim for the insertion of the tire-sections within the rim's channel, and means for clamping the tire-sections and detachably connecting the same to the rim.

2. In a vehicle-wheel, the combination with a continuous rim, of a circumferential dovetailed channel in the face thereof, a rubber tire composed of a plurality of arc-sections, a base to each section conforming in shape to that of the rim's channel, a series of openings in the rim of the wheel for the insertion and removal of tire-sections, covers for said openings, and means for clamping the tire-sections and detachably connecting the same to the wheel's rim.

3. In a vehicle-wheel, the combination with the rim thereof, of a circumferential dovetailed channel therein, a rubber tire composed of arc-sections, a base to each section corresponding in shape to that of the rim's channel, and openings in the rim through which the sections of the tire are inserted and removed from within the circumferential channel.

In testimony whereof I have hereunto affixed my signature in the presence of witnesses.

EMERY GATES.

In presence of—
 N. A. ACKER,
 D. B. RICHARDS.